United States Patent

[11] 3,585,587

[72] Inventor Hanno Gillmann
Constance, Germany

[21] Appl. No. 760,844
[22] Filed Sept. 19, 1968
[45] Patented June 15, 1971
[73] Assignee Telefunken Patentverwertungsgesellschaft m.b.H.
Ulm Donau, Germany
[32] Priority Sept. 20, 1967
[33] Germany
[31] P 15 49 928.2

[54] DEVICE FOR EVALUATING CHARACTERS IDENTIFIED IN A CHARACTER READER
7 Claims, 3 Drawing Figs.

[52] U.S. Cl. ........ 340/146.3, 307/235
[51] Int. Cl. ........ G06k 9/06
[50] Field of Search ........ 340/146.3; 328/115, 116; 307/235

[56] References Cited

UNITED STATES PATENTS

| | | | |
|---|---|---|---|
| 3,104,369 | 9/1963 | Rabinow et al. | 340/146.3 |
| 3,160,855 | 12/1964 | Holt | 340/146.3 |
| 3,167,746 | 1/1965 | Reines et al. | 340/146.3 |
| 3,192,505 | 6/1965 | Rosenblatt | 340/146.3 |
| 3,496,542 | 2/1970 | Rabinow | 340/146.3 |

*Primary Examiner*—Maynard R. Wilbur
*Assistant Examiner*—Leo H. Boudreau
*Attorney*—Spencer and Kaye

ABSTRACT: An arrangement for evaluating the character identification performed by a character reader of the type having a plurality of groups of output lines, each group corresponding to a different character type and the signal on each line being proportional to the degree of coincidence between a character which has been read and a particular character pattern, which arrangement includes a threshold value detection unit associated with each character type and connected to all of the character reader output lines for producing an output only when the highest amplitude signal appearing on the lines exceeds the threshold value of that unit, an OR element associated with each group of lines and connected to all of the lines of its associated group for producing an output signal whenever the signal whose amplitude is the highest of the signals appearing on all of the lines appears on one of the lines of its associated group, and gate control means for each group of lines connected to the threshold detection unit and the OR element of its associated group for producing a gate control signal only when a signal is produced by both the unit and the OR element to which it is connected.

INVENTOR
Hanno Gillmann
BY Spencer & Kaye
ATTORNEYS

PATENTED JUN 15 1971 3,585,587

INVENTOR
Hanno Gillmann

BY Spencer & Kaye
ATTORNEYS

DEVICE FOR EVALUATING CHARACTERS IDENTIFIED IN A CHARACTER READER

BACKGROUND OF THE INVENTION

The present invention relates to an arrangement for evaluating the identification performed by a character reader, and particularly to an arrangement for use with character readers constructed to read several different character types.

The automatic identification of optically or magnetically sensed characters is often effectuated by evaluating each elemental area of a scanning field in which a character is disposed and by producing a plurality of output signals each having an amplitude representing the degree of correspondence between the pattern of the elemental areas covered by the character being read and a storage pattern corresponding to a particular character. The output signal corresponding to each stored pattern appears on a separate line and a maximum filter is often provided to produce an indication of which line presents the highest output signal. There is also often provided a check circuit which is arranged to produce and output only when the output from the maximum filter exceeds the predetermined value, and hence to verify that a certain minimum degree of coincidence exists between the highest output signal and one particular stored pattern.

Character readers are known in which a character is scanned in the character reading, or scanning, field by means of photodiodes whose output signals are stored in the elements of a matrix-type memory. The memory contents are simultaneously compared at certain evaluation times with a number of special bit patterns each of which corresponds to the structure of a given character. That character whose pattern coincides most closely with the photodiode output signal pattern can be identified since its associated line has a signal voltage which is higher than that appearing on the line associated with any other pattern.

This highest voltage occurring in one of the lines is fed into a binary threshold value detector, preferably after having passed through the maximum filter which suppresses the signals on the other lines, to check that its amplitude exceeds a predetermined value. This binary threshold detector emits an output signal having a fixed amplitude whenever its input signal exceeds a preset threshold value. The magnitude of this threshold value corresponds with the required accuracy of the character recognition and is selected, in most cases, so that it is exceeded only when the coincidence between the character which has been read and a pattern is very good.

Such a setting of the threshold value often causes a high rejection rate to occur during the reading of certain types of characters, i.e. many characters which were not sufficiently unambiguously identified due to having been imperfectly printed, or due to spots on the paper, or because they were inaccurately centered in the scanning field, are marked as rejects by the machine and must then be separately evaluated.

When the character reader is to read characters of different types, for example numbers and letters, it is often permissible for the letters, for example, to be read with a lower accuracy than the numbers. Therefore, if the same degree of coincidence were required for each type of character, the result would be an undesirably high rejection rate for at least one type of character.

Moreover, it often occurs that the required accuracy for reading each character type will vary during the course of a character reading operation so that if the degree of coincidence which must be achieved to prevent the occurrence of a rejection signal is the same for all character types and can not be varied during a reading operation, it will result that at certain times, and for certain character types, the character reader will require an unnecessarily high degree of coincidence between the character being read and the stored patterns and at other times, or for certain character types, the character reader will require an unacceptably low coincidence.

SUMMARY OF THE INVENTION

It is a primary object of the present invention to overcome these drawbacks and difficulties.

Another object of the invention is to permit the required degree of coincidence to be separately established for each character type.

Still another object of the invention is to permit the degree of coincidence required for each character type to be readily varied at any time.

Yet a further object of the invention is to substantially reduce the rejection rate of such character readers.

These and other objects according to the invention are achieved by the provision of certain improvements in a character-identifying device for use with a character reader which compares a detected character with different predetermined character patterns relating to several character types and which applies to each of a plurality of conductors a signal whose amplitude indicates the degree of coincidence of the detected character with a respective predetermined pattern, the conductors being arranged in several groups each associated with characters of a respective type, which device includes a maximum filter having a plurality of inputs each connected to a respective conductor and arranged to provide an output indicating which conductor is carrying the highest amplitude signal. In accordance with the improvement of the invention, the device includes a plurality of signal evaluation circuits each associated with a respective character type and each having an independently adjustable conduction threshold corresponding to a predetermined degree of coincidence between the detected character and a pattern of the associated character type, each evaluation circuit being operatively connected to all of the conductors associated with the device and being arranged to produce and output control signal when the highest signal amplitude which it receives exceeds its conduction threshold.

In a particular embodiment of the present invention, either the inputs or the outputs of the maximum filter are connected to a combining element, for example an OR element, whose output is connected to each evaluation circuit, and each evaluation circuit includes a threshold value detection unit whose conduction threshold corresponds to the predetermined degree of coincidence for its associated character type, and a gate element having an input connected to the output of its associated detection unit for producing a gate-opening signal when an output is produced by its associated unit and when the highest amplitude signal appears on a conductor in the group whose associated character type is the same as that of the particular evaluation circuit.

In accordance with a further embodiment of the invention, the maximum filter has a plurality of outputs, each associated with a respective input, and there is also provided a check circuit composed of a plurality of threshold detectors each connected to a respective filter output only when the amplitude of the signal which it receives exceeds a predetermined threshold value, all of the threshold detectors associated with a respective group of conductors being arranged to have the same, commonly adjustable threshold value.

Arrangements according to the invention permit, for example in the reading of vouchers or checks, an evaluation of numbers, such as the account numbers and numbers relating to the value of the checks or vouchers, to be read with greater accuracy than letters, such as the name and address of the account holder, so that a reject signal will not be produced simply because a particular letter is not read with the accuracy required in the reading of numbers. Such a procedure is often preferable because the incorrect reading of a letter is often less troublesome than the incorrect reading of a number. For example, if an error should occur in the reading of a letter on a check or voucher, the most harmful result will often be that the name of the account holder, or the name of his street or city, will be misspelled on the account statement. Since such an error is generally inconsequential, a reduction in the accuracy required for reading such information will reduce the number of rejections signaled by the reading device and hence will increase its effective reading speed.

DESCRIPTION OF THE PREFERRED EMBODIMENTS

Figure 1A:
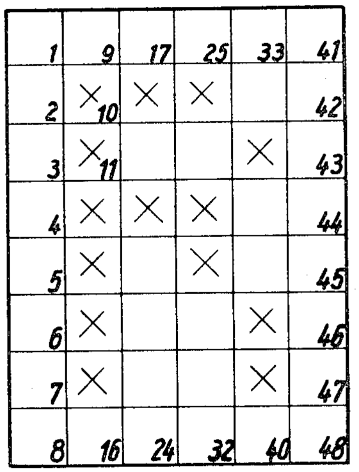
FIG. 1*a* is a pictorial representation of a character reading field.

FIG. 1*a* is a schematic representation of a rectangular scanning field which is subdivided into 6×8picture elements. The photoelectric cells scanning the character are distributed over the scanning field in the pattern of the picture elements. A character, here the letter "R," appearing in the scanning field would thus, for example, make the picture elements marked with crosses appear black and would cause each of the corresponding photoelectric cells to emit a signal.

Figure 1B:
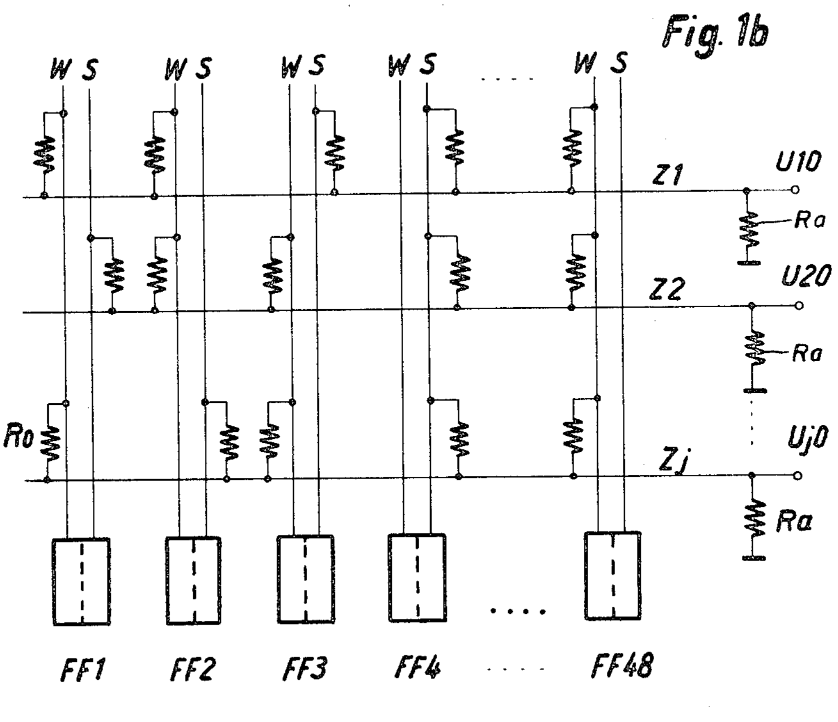
FIG. 1*b* is a circuit diagram of a comparison matrix for comparing a read character with a set of character patterns.

In the resistor matrix of FIG. 1*b*, a respective one of the bistable flip-flops FF1 to FF48 is associated with each photoelectric cell. A line W and a further line S for the negated signal of the line W are connected to each of the flip-flops. This total of 48 pairs of lines W, S form the 48 columns of the matrix. The number of rows in the matrix is equal to the number j of different characters to be recognized.

The row lines Z1 to Z*j* leading from the matrix are each provided with a respective output terminal U10 to U*j* O and are each connected to ground via a respective resistor R*a*. The points of intersection of the matrix are indicated by resistors R*o* each of which connects its row line with either the W-line or the S-line of an associated flip-flop FF1 to FF48. If a given resistor is connected to the column line W, this means that the corresponding picture element in the scanning field of FIG. 1*a* will be black when the scanned character corresponds to the particular character pattern represented by the matrix row with which that resistor is associated. Conversely, the connection, via a resistor 0, of the row line with a column line S indicates that this particular picture element will not include a portion of a character corresponding to the particular character pattern of the associated matrix row, i.e. the picture element will be white. a.

Let it be assumed that a character presently in the scanning field exactly corresponds to a stored nominal character. During evaluation, or sensing, those flip-flops FF1 to FF48 corresponding to the picture elements in which portions of the character appear are set to state "1, " whereas the other flip-flops remain in state "o. " It follows from the above assumption that every intersection point of one specific row line will be connected, via resistors R*o*, to that output W or S each flip-flop which is at a greater potential. Thus, in the one row line corresponding to the recognized character a current flows from each flip-flop via a resistor R*o* and is conducted to ground via the appropriate resistor R*a*. Therefore, a total of 48 partial, equala-amplitude currents are summed in the resistor R*a* so that the voltage drop appearing thereacross is greater than that of the corresponding resistors of the other row lines.

At least some of the other row lines generally also produce partial currents whose amplitudes correspond to the number of their resistors R*o* which are at the higher potential. However, the current sum in each of these other row lines is resistor high enough to produce s similar signal at its corresponding resistor R*a*.

In practice, however, it can not be assumed that a character to be read will create a pattern which corresponds exactly with the pattern which its associated row line is constructed to match. It can rather only be demanded that the actual character coincide with a certain minimum number of the picture elements of its associated predetermined pattern.

The above-described mode of character reading is known. The evaluation devices according to the present invention make possible the evaluation of the voltages in the signal lines, and particularly the identification of that line containing the highest voltage signal.

Figure 2:
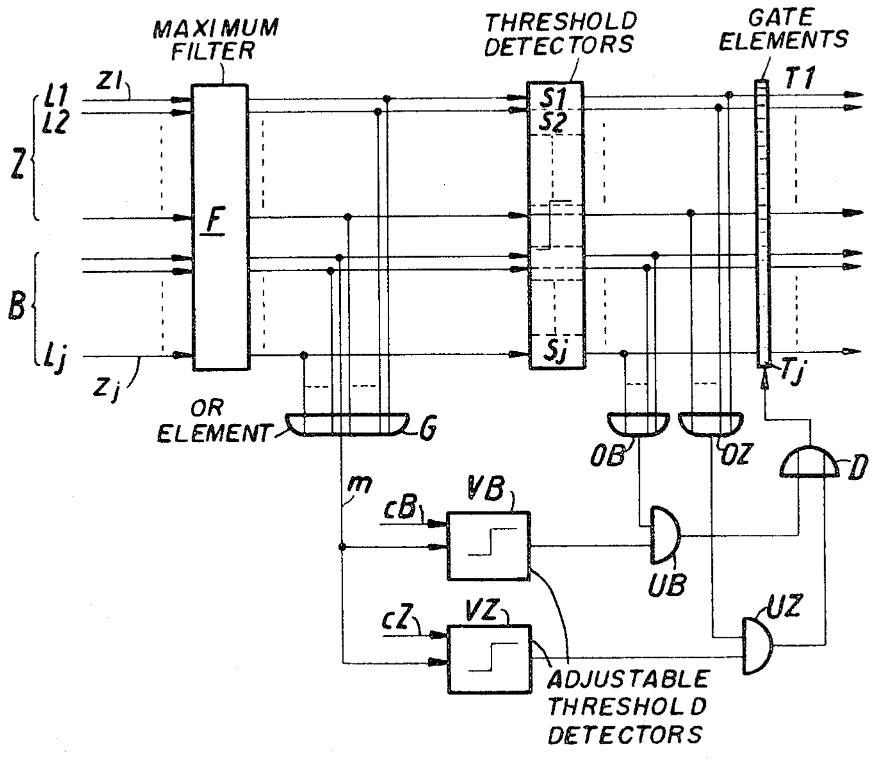
FIG. 2 is a block circuit diagram on one embodiment of the evaluation device according to the present invention.

Referring now to FIG. 2, let it be assumed that the matrix rows of FIG. 1*b* are divided into two bundles Z and B, of which bundle Z is associated with the numbers to be read and the other bundle B with the letter patterns. All of the lines Z1 to Z*j* are connected to the inputs of a known maximum filter F of the type disclosed, for example, in U.S. Pat. No. 3,092,732,issued to R. E. Milford on June 4, 1963. Such maximum filters serve to indicate that line among a group of signal lines carrying simultaneously arriving signals L1 to L*j* which is carrying the highest signal voltage.

Such a circuit can be constructed by connecting each voltage-carrying line to the base of a respective transistor. The emitters of these transistors are connected to a common resistor to produce a bias potential, and the increased collector current of the transistor receiving the highest input signal blocks the other transistors, which are receiving lower input signals, due to the resulting bias which is proportional to the highest transistor output.

It is also possible, according to a further development of the invention described in the above-cited patent, to connect a separate resistor between the emitter electrode of each transistor and the common resistor so that when, for example, the ratio of the highest line voltage to the next-highest line voltage falls below a certain predetermined value, both the transistor receiving the highest input signal and the transistor receiving the second-highest input signal emit output signals. The occurrence of more than one output signal indicates that the scanned character does not coincide sufficiently unambiguously with only one particular character pattern and that a rejection signal must be initiated.

In the circuit of FIG. 2, all of the outputs of the maximum filter F are connected to the inputs of an OR element G which consists, in a known manner, of diodes and resistors and whose output line m is connected to the inputs of two threshold value detectors VB and VZ whose threshold values are controlled by voltages applied to their threshold value setting inputs *c* B and *c*Z. Alternately, OR element G could have its inputs connected to conductor lines Z1 to Z*j*. The outputs of the maximum filter are also each connected to a respective threshold detector S1, S2,...S*j* of a threshold value circuit, each detector producing an output having a preset value when the signal applied to its input exceeds a certain value corresponding to the occurrence of a character recognition signal in the associated line Z1 to Z*j* of the matrix of FIG. 1*b*.

The output lines of those threshold value circuits which are associated with number patterns are connected to the inputs of an OR element OZ and those lines which are associated with letter patterns are connected to the inputs of an OR element OB. In addition, each one of these output lines is connected to a respective one of the output gates T1 to T*j* whose operation is controlled by an OR element D. The outputs of the threshold value detectors VB and VZ, as well as the outputs of the OR elements OB and OZ are connected to the inputs of respective AND elements UB and UZ. The AND elements are connected to control the output from OR element D.

In the operation of the circuit, a character present in the scanning field of the associated reader causes different voltage values to be imparted to the input signals L1 to L*j* delivered to the maximum filter F. The maximum filter F transfers only the highest one of these voltage values, in the case of a sufficiently unambiguous character identification, to the associated output line, whereas all of the other output lines carry no voltage. This voltage value is applied via the OR element G to the maximum signal line *m* which is connected to the information input lines of the threshold value detectors VB and VZ. The two threshold value detectors are arranged to have different, preferably controllable, switching thresholds.

The threshold value circuits S1 to S*j* serve to check the highest voltage signal received by filter F. This signal must exceed a certain, predetermined, minimum value in order to verify that the character being read coincides sufficiently with one particular character pattern and in order to be delivered in binary form to the appropriate output gate T1 to T*j*. If the voltage is high enough, one of gates OB or OZ, depending on whether a letter or a number was read, will produce an output signal. The presence of such a signal permits the passage, via the appropriate AND gate UB or UZ, of an output from that threshold value detector VB or VZ whose threshold value is adjusted to the respective type of character. The resulting gate signal from OR element D opens the output gates T1 to T*j* whenever the switching threshold of the corresponding threshold value detector has been exceeded to that an indication of the identified character will be sent over the output line of the associated output gate.

If, as was mentioned previously, numbers are to be read with greater accuracy than letters, the conduction threshold of the threshold value detector VZ must be set higher than that of VB. When the opposite is desired, the switching thresholds must be appropriately varied. If such a changeover is not to be accomplished during operation, the OR element OZ as well as the AND element UZ can be eliminated and the threshold value detector VZ can be directly connected to the input of the OR element D since when the OR element OB produces no output signal, i.e. when the character to be evaluated is not a letter, the character can only be a number which, for the above-mentioned reasons, is associated with the higher conduction threshold value of element VZ.

It can also be desirable, in order to assure a reading accuracy which is appropriate for each individual character group, to construct each of the threshold value circuits S1 to S*j* of each character group to have an adjustable switching threshold, which can be set, for example in the situation where the reading accuracy of numbers has to be greater than that of letters, so that the threshold value circuits associated with the numbers are provided with a higher switching threshold than those threshold value circuits which are associated with the letters.

According to a particular embodiment of the evaluation device of the present invention, the maximum filter F is constructed in the manner mentioned above so that it conducts, in addition to a signal corresponding to the highest input signal, also a signal representing the second-highest input signal if the latter exceeds a certain percentage of the former. When employing a maximum filter having this characteristic, it is necessary to provide an additional doublecheck circuit (not shown) which emits a reject signal whenever a signal appears on more than one output line on the maximum filter. If this should occur for that character type whose output gates are to be opened in accordance with the decision made by the maximum filter F, the transfer of signals from those output gates must be prevented with the aid of further gates since the character which was read does not coincide with sufficient certainty to only one particular character pattern.

The present invention is not limited to use with character readers which perform their evaluation with the aid of a correlation matrix as previously described but can also be used, for example, with readers with identify a character according to the voltage waveform produced by a scanning element. It is furthermore possible to employ the present invention for improving the identification of magnetically readable characters in the same manner as electrooptically readable characters.

It will be understood that the above description of the present invention is susceptible to various modifications, changes and adaptations.

I claim:

1. In a character identifying device for use with a character reader which compares a detected character with different predetermined character patterns and which applies to each of a plurality of conductors a signal whose amplitude indicates the degree of coincidence of the detected character with the predetermined patterns, which device includes a maximum filter having a plurality of inputs each connected to a respective conductor and a plurality of outputs each associated with a respective one of said inputs and delivering a signal when this input receives the highest amplitude signal, the improvement comprising a plurality of signal evaluation circuits each associated with a respective group of said outputs and each including means for providing a conduction threshold corresponding to a predetermined degree of coincidence between a detected character and a group of predetermined patterns of a character type associated with said group of outputs, these thresholds being of different height in the different signal evaluation circuits.

2. An arrangement as defined in claim 1 wherein each said evaluation circuit comprises: a threshold value detection unit whose conduction threshold corresponds to the predetermined degree of coincidence for its associated character type; and a gate element having an information input connected to the output of its associated detection unit and arranged to produce a gate opening signal when an output control signal is produced by its associated unit and when the highest amplitude signal appears on a conductor in the group whose associated character type is the same as that of said evaluation circuit.

3. An arrangement as defined in claim 1 wherein said filter has a plurality of outputs each associated with a respective one of its inputs and is arranged to provide an output signal only at that output associated with the filter input receiving the highest amplitude signal, which output signal is proportional to such input signal, said arrangement further comprising a check circuit composed of a plurality of threshold detectors each connected to a respective filter output and each arranged to produce an output having a fixed amplitude only when the amplitude of the signal which it receives exceeds a predetermined threshold value, the threshold detectors connected to a group of the filter outputs having commonly adjustable threshold values.

4. An arrangement as defined in claim 2 wherein said filter has a plurality of outputs each associated with a respective one of its inputs and is arranged to provide an output signal only at that output associated with the filter input receiving the highest amplitude signal, and each said evaluation circuit further comprises and OR element having inputs connected to all of the filter outputs associated with the conductor group whose character type is the same as that of said evaluation circuit, said OR element being connected to a gating input of said gate element of its associated evaluation circuit for supplying a gating signal thereto only when the output signal from said filter appears on an output connected to said OR element, whereby said gate element produces a gate opening signal only when signals appear at both its information input and its gating input.

5. An arrangement as defined in claim 4 further comprising: an OR UNIT HAVING A PLURALITY OF INPUTS EACH CONNECTED TO THE OUTPUT OF THE GATE ELEMENT OF a respective one of said evaluation circuits and arranged to produce an output whenever a gate opening signal is produced by any one of said gate elements; and a plurality of output gates each connected to a respective filter output and all connected to said OR unit, said output gates being arranged to pass the signal appearing at any filter output whenever an output is produced by said OR unit.

6. An arrangement as defined in claim 1 wherein one group of outputs is associated with numbers and another group of outputs is associated with letters.

7. An arrangement as defined in claim 1, wherein said means for providing a conduction threshold of each said circuit have an input for selectively adjusting the threshold.